Beach & Klaucke,
Knife and Fork.
Nº 57,662.          Patented Sept. 4, 1866.
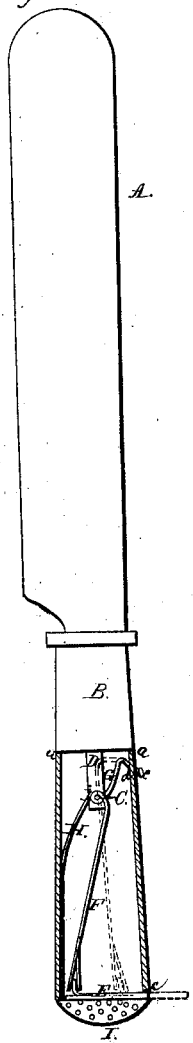
Fig. 1.
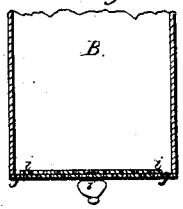
Fig. 6.
Fig. 4.
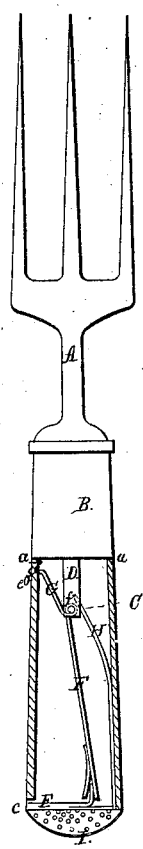
Fig. 2.
Fig. 5.
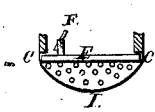
Fig. 3.
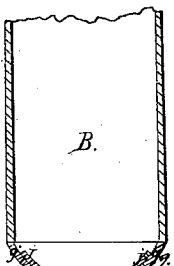
Fig. 7.
Attest:
Galon C. Kenion
Thomas J. Hurdle
Inventor:
Frederick C. Beach
Alex. A. C. Klaucke

UNITED STATES PATENT OFFICE.

FREDERICK C. BEACH, OF STRATFORD, CONNECTICUT, AND ALEXANDER A. C. KLAUCKE, OF WASHINGTON, DISTRICT OF COLUMBIA.

IMPROVED KNIFE AND FORK.

Specification forming part of Letters Patent No. 57,662, dated September 4, 1866.

*To all whom it may concern:*

Be it known that we, FREDERICK C. BEACH, of Stratford, in the county of Fairfield and State of Connecticut, and ALEXANDER A. C. KLAUCKE, of Washington, District of Columbia, have made new and useful Improvements in Knives and Forks; and we do hereby declare the following to be a full and exact description of the same, which will enable others skilled in the art to which our invention appertains to fully understand and use the same, reference being had to the accompanying drawings, making part of this specification, in which—

Figure 1 is a plan of a knife, showing our improvement. Fig. 2 is a plan of a fork with our improvement attached. Figs. 3, 4, and 5 show different parts of our invention. Figs. 6 and 7 show modifications of our invention.

In our improvement the handles of knives and forks are constructed hollow, and adapted to contain salt or pepper, with suitable means to eject the same, thus forming a combined knife and salt-cellar and fork and pepper-box, or vice versa.

In the drawings, A represents the blade of a knife or the shank of a fork, and B the handle of the same. The tang D of the blade or shank is fastened in the usual manner, being near its end riveted, as shown at C. The lower part, I, of the handle B is made hollow from the line *a* downward, sufficient solid handle being left above to secure and steady the tang and to firmly attach the blade or shank.

The bottom end of the handle B is perforated, as shown at I, and is covered on the inside by a slide, E, which is fastened in any suitable manner near one end to a lever, F, and moves horizontally through an opening or slot, *c*, in the handle B.

The lever F has its pivot on the lower rivet, C, and an arm, G, which extends through a slot, *d*, in the handle B. A little button, *e*, allows the lever to be moved easily.

A spring, H, bears against a projection, *f*, on the lever F, and by its pressure keeps the lower part of the longer arm of the lever, to which the slide is attached, in such position as to keep the latter inside of the handle.

The operation of our invention is indicated by red lines in Fig. 1. On pressing the button *e* slightly inward and upward, the lever G moves the slide E out through the slot *c*, thus allowing the salt or pepper with which the handle may be filled to be ejected, by opening the perforations in the lower part, I, of the handle. On releasing the button *e* the pressure of the spring H returns the lever and slide to their original position, thus closing the perforations at I, and preventing the contents of the handle from escaping or being spilled.

We do not confine ourselves to any particular mode of operating the slide, but show some modifications of the same in Figs. 6 and 7.

In the same, *g* represents the perforated bottom end of the handle B, provided in its center with a slot. This affords a bearing to the pin *i*, which is attached to a perforated sliding plate, *j*, in such a manner that when then pin *i* is in the center of the slot and bottom end of the handle the perforations do not cover the perforations of the bottom end of the handle, but when the pin *i* is moved either way to the end of the slot the holes in plate *j* cover those of the bottom end of the handle, and allow the salt or pepper to be ejected contained in the hollow handle.

The bottom end of the handle may be perforated, or, in its stead, a plate inserted, to suit the convenience of the manufacturer; and it may be made straight, as shown in Fig. 6, or round, as shown in Fig. 7.

If the bottom end is perforated, the device shown in Figs. 4 and 5 may serve to fill the hollow handle when all pepper and salt are used out of them. It consists of an opening in the side of the handle, which is closed by a screw-plug; but any suitable device may be used for that purpose.

We do not confine ourselves to any specific device; but,

What we claim as new, and desire to secure by Letters Patent, is—

The combination, with a knife or fork, of a receptacle for pepper, salt, or other condiment, in any manner substantially as herein described.

FREDERICK C. BEACH.
    ALEXR. A. C. KLAUCKE.

Witnesses:
 SOLON C. KEMON,
 THOMAS J. HURDLE.